United States Patent [19]

Mattei et al.

[11] Patent Number: 4,617,782
[45] Date of Patent: Oct. 21, 1986

[54] METHOD FOR WRAPPING BATCHES OF STACKED PRODUCTS SO AS TO FORM SEALED PACKETS

[75] Inventors: Riccardo Mattei; Roberto Natali, both of Bologna, Italy

[73] Assignee: G. D. Società per Azioni, Bologna, Italy

[21] Appl. No.: 618,947

[22] Filed: Jun. 8, 1984

[30] Foreign Application Priority Data

Jun. 14, 1983 [IT] Italy .................................. 3460 A/83

[51] Int. Cl.$^4$ .......................... B65B 7/08; B65B 11/32
[52] U.S. Cl. ........................................ 53/479; 53/466; 53/482; 53/234; 53/373
[58] Field of Search ................. 53/466, 481, 482, 479, 53/229, 234, 373; 493/209

[56] References Cited

U.S. PATENT DOCUMENTS

| | | | |
|---|---|---|---|
| 2,196,666 | 4/1940 | Moore | 53/482 |
| 2,606,856 | 8/1952 | Hurrey | 53/481 X |
| 2,966,832 | 1/1961 | Vergobbi | 53/234 X |
| 4,024,692 | 5/1977 | Young | 53/466 |
| 4,265,073 | 5/1981 | Seragnoli | 53/234 X |

FOREIGN PATENT DOCUMENTS 1055146  1/1967  United Kingdom .

*Primary Examiner*—John Sipos
*Attorney, Agent, or Firm*—Cushman, Darby & Cushman

[57] ABSTRACT

Disclosed herein is a method for wrapping batches of products, in particular candies, and for forming sealed packets, which envisages: a batch of products being supplied to a wrapping wheel; a sheet of heat-sealing material with two lateral downward turned borders being placed above the batch; the said borders being welded one to the other in order to form a tube, the opposite extremities of which are first flattened through the insertion in between them of divarication means; the said extremities then being sealed by welding/pre-folding grippers designed to make, on each welded tubular extremity, weakening lines that aid the subsequent folding of the said extremities.

1 Claim, 9 Drawing Figures

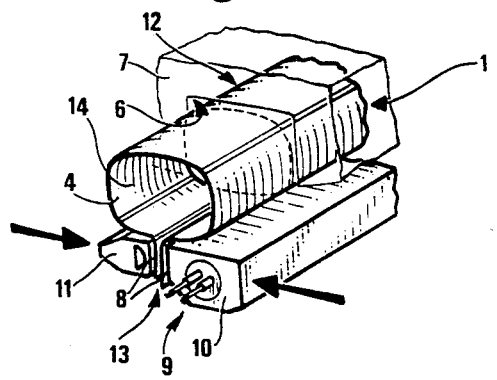
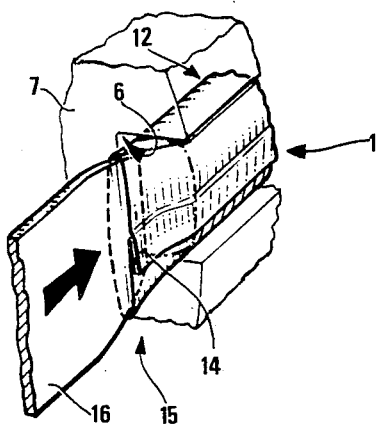
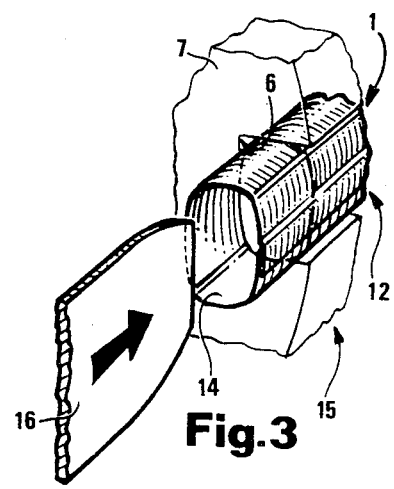
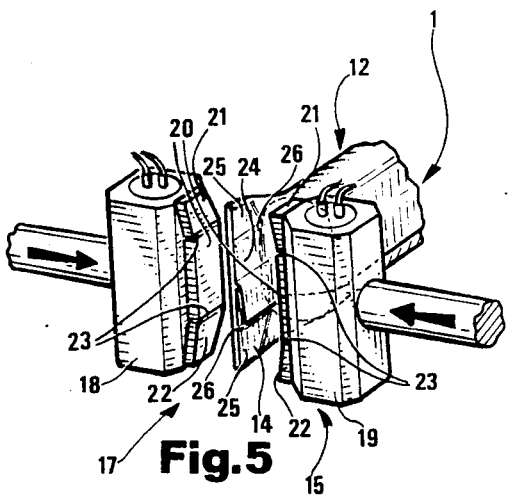

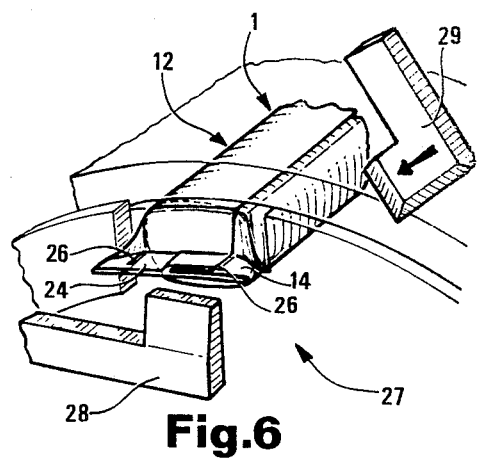
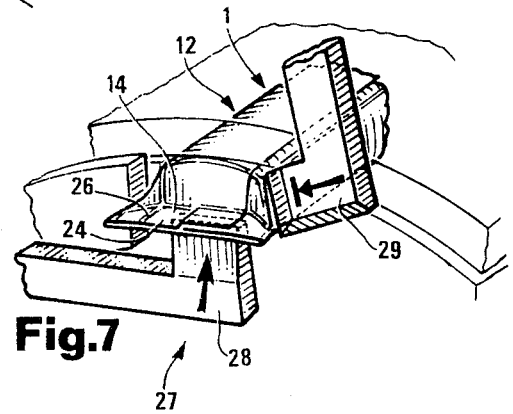
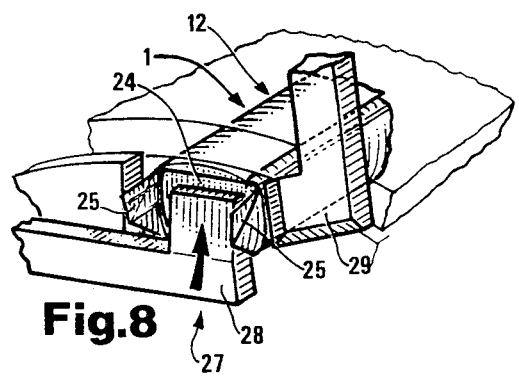
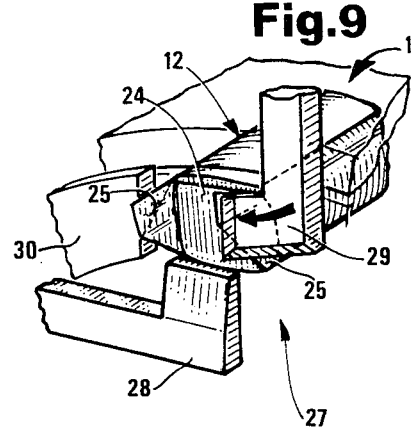

METHOD FOR WRAPPING BATCHES OF STACKED PRODUCTS SO AS TO FORM SEALED PACKETS

BACKGROUND OF THE INVENTION

The invention relates to a method for wrapping batches of stacked products so as to form sealed packets and, in particular, to a method suitable for use in the confectionery or pharmaceutical industry for the formation of packets of candles or lozenges.

DESCRIPTION OF THE PRIOR ART

In general, the packeted products contained in the packets normally found on the market, usually of a flattened parallelepiped shape, are placed one at the side of the other with the longer sides placed on edge with respect to a plane perpendicular to the axis of the batch to be wrapped. The packets formed consequently have at least one relatively reduced crosswise dimension and permit the use of ordinary welding grippers which, by grasping the protruding edges of a tube placed around the batch, seal them in contact with the extremities of the batch without creating false folds or other imperfections which, in time, could cause air to pass into the inside of the formed packet.

What has been stated above does not apply to another type of packet customarily found on the market, in which the products are placed sideways, one next to the other, in such a way as to form a much more compact and rigid batch which, seen in a sectional view, is generally square or rectangular in shape. With the last mentioned type of packet, the extremities are not normally sealed but are simply folded. Alternatively, when the nature of the product renders necessary the sealing of the packet, this is done using a tube, the extremities of which to be welded protrude noticeably beyond the extremities of the batch to be wrapped because of the difficulty of bringing one close to the other, without false folds being made, the opposite borders of each extremity of the said tube when the crosswise dimensions of this are considerable. However, sealed packets made in this way are not very acceptable from the point of view of appearance, are difficult to stack, do not keep the stacked products correctly in contact with one another and are subject to breaking easily in the region of the extremities thereof.

SUMMARY OF THE INVENTION

The object of the invention is to evolve a method for wrapping, in the form of a sealed packet, stacked products placed sideways, one next to the other, wherein the difficulties described above do not occur.

The said object is achieved with the method according to the invention for wrapping batches of stacked products so as to form sealed packets, the operational sequence for which consists in:

folding a sheet of heat-sealing wrapping material in U fashion around each of the said batches;

welding, one to the other, two lateral borders of each of the said sheets so as to form a lateral axial sealing rib and to give the said sheet tubular form with extreme parts protruding axially from the batch concerned;

inserting inside each of the said extreme parts, a divarication blade designed to deform the said extremity and to give it a flattened shape;

sealing each of the said flattened extremities by means of welding grippers; and folding each of the said sealed extreme parts against one corresponding extremity of the said batch.

BRIEF DESCRIPTION OF THE DRAWINGS

The characteristics and advantages of the invention will emerge from the description that follows, with reference to the accompanying drawings wherein, as an unlimited example, one embodiment is illustrated, and in which:

FIGS. 2 to 9 show, diagrammatically in a perspective view, a number of successive operations for wrapping a batch of candies so as to form a sealed packet according to the method forming the subject of the invention.

DESCRIPTION OF THE PREFERRED EMBODIMENT

Figure 1:
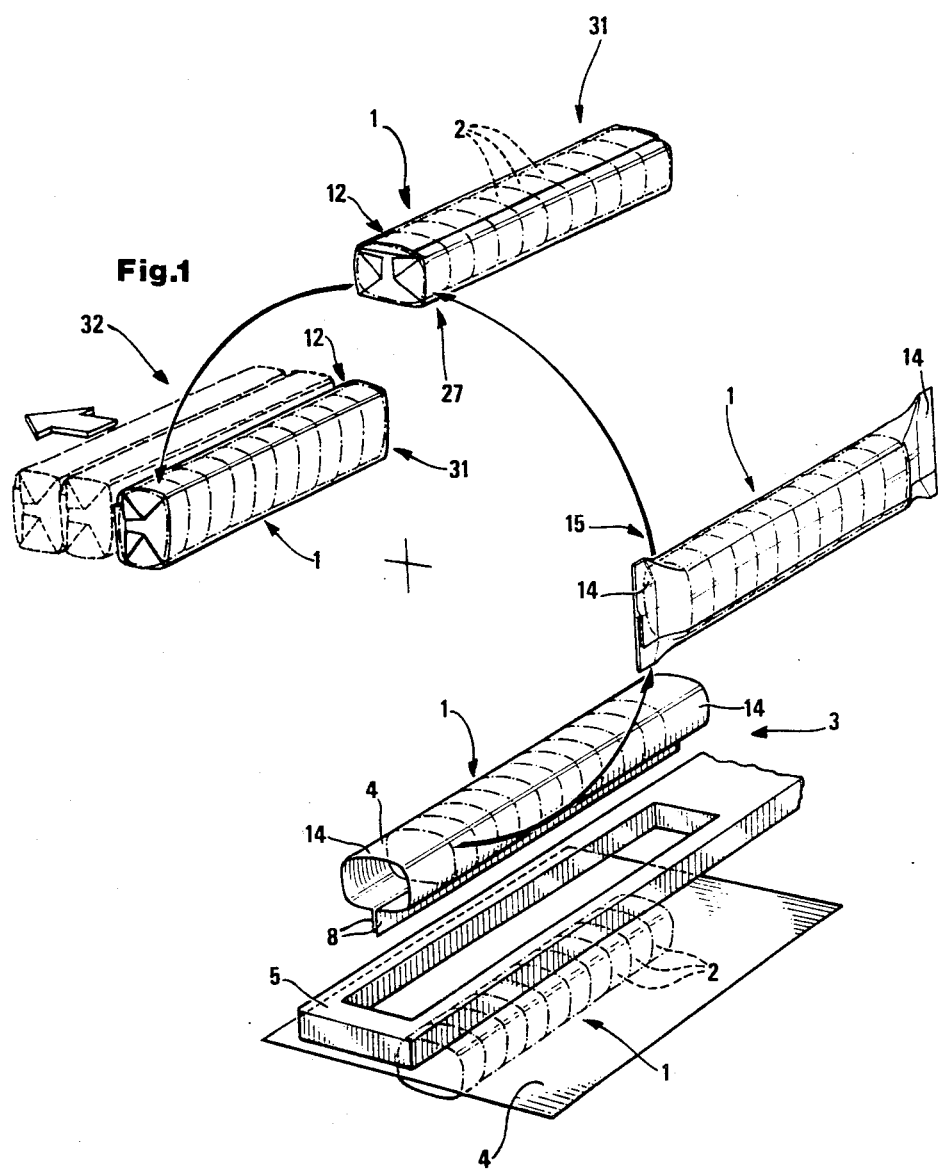
FIG. 1 shows, diagrammatically in a perspective view, a wrapping line for a candy packeting machine set up in accordance with the concepts of the invention.

In FIG. 1 is shown, for a (non-illustrated) packeting machine, a line for wrapping batches 1 of products 2, in particular candies, each of which is of flattened parallelepiped shape and is placed, sideways, one next to the other.

At the beginning of the wrapping line, the preformed batch 1 is supplied to a first wrapping station 3 in the region of which non-illustrated infeed means place a sheet of heat-sealing wrapping material 4 above the said batch 1.

Subsequently, the batch 1 is thrust, by non-illustrated pusher means, against the sheet 4 and across a folding mold 5 by which the sheet 4 is folded transversely into a U around the lateral surface of the batch 1. The said batch is then, as shown in FIG. 2, inserted, together with the sheet 4, into the inside of a transportation pocket 6 made in the external periphery of a wrapping wheel 7 parallel to a generatrix of this.

In accordance with what is shown in FIG. 2, two opposite lateral borders 8 of the sheet 4 protrude radially ouwards from the pocket 6 concerned and these are carried into contact with one another by welding grippers 9, the two jaws of which are constituted by a heat-sealing element 10 and by a contrast element 11, respectively. The grippers 9 determine the formation of a tube 12 provided laterally with a heat-sealed rib 13 constituted by the two borders 8 rendered integral one with the other, and having two tubular or extreme parts 14 that protrude outwards with respect to the opposite extremities of both the batch 1 and the corresponding pocket 6.

The wheel 7, rotating one step through an angle of 90°, infeeds the batch 1 and the corresponding tube 12 to a second wrapping station 15 in the region of which, as can be seen in FIGS. 3 and 4, a divarication blade 16 is inserted into the inside of each tubular extremity 14. The said blade is tapered towards the free extremity and, as it is inserted in stages into the inside of the tubular extremity 14, first of all it determines the progressive flattening of the extremity in such a way as to place this in a position virtually tangential to the periphery of the wheel 7, and then it gives the said extremity a slight plastic stretch in order to render the said flattening permanent.

After this, again at a point corresponding to the station 15, the blades 16 are extracted from the tubular extremities 14 and the latter are sealed, as shown in FIG. 5, through the use of welding/pre-folding grippers 17. Each of the grippers 17 comprises two heat-sealing elements 18 and 19 that provide two mated heat-sealing surfaces, each of which having a central flat part 20 and two lateral parts 21 and 22 inclined in opposite directions with respect to the central part 20 and separated from this by two dividing lines or narrow gaps 23.

Following the operation of the grippers 17, each tubular extremity 14 is welded and adopts a flat rib shape on which can be distinguished a central part 24 corresponding to the central parts 20, and two lateral flaps 25 corresponding to the lateral parts 21 and 22, separated from the central part 24 by two weakening lines 26 corresponding to the lines or gaps 23, which weakening lines are sealed to a lesser extent than the rest of the extremity 14.

Through a further 90° rotation, the wrapping wheel 7 infeeds the batch 1 and the corresponding tube 12 to a third wrapping station 27 where a first folder member 28, movable radially with respect to the wheel 7, folds the central part 24 of the relevant extremity 14 outwards and against the corresponding extremity of the batch 1.

Due to the presence of the lines 26, the folding outwards of the central part 24, depicted in FIGS. 6 and 7, brings about, as shown in FIG. 8, the folding of the lateral flaps 25 in a direction axial with respect to the wheel 7, outside the relevant pocket 6.

As shown in FIGS. 8 and 9, the flap 25 placed upstream in the movement direction of the wheel 7, is folded against the part 24 and the extremity of the batch 1 by a pusher member 29 movable in a plane perpendicular to the axis of the wheel 7, while following contrast with a fixed locator element 30, the other flap 25 is, as shown in FIG. 9, folded against the part 24. The contrast between the fixed locator element 30 and the said flap 25 occurs when the wheel 7 is displaced by a 90° step in order to carry the batch 1 and the corresponding tube 12, now completely folded to form a packet 31, towards a discharge station 32 where the packets 31 are radially expelled from the corresponding pockets 6, this being done with the use of non-illustrated pusher means.

What is claimed is:

1. Method for wrapping a batch of stacked products so as to form a sealed packet, the steps comprising:
    folding a sheet of heat-sealing wrapping material, of a length greater than that of the batch and a width greater than the periphery of the batch, in U fashion around the batch to leave two juxtaposed borders of the sheet extending the length, and beyond the ends, of the batch;
    welding, one to the other, the two borders of the sheet so as to provide a longitudinal sealing rib and to form the sheet into a tube having ends protruding beyond the ends of the batch;
    flattening the ends of the tube;
    sealing at least part of each of the flattened ends by moving together opposing heating jaws each having a central part separated by gaps from two lateral parts and welding the flattened ends corresponding to said central and lateral parts while leaving weakened folding lines sealed to a lesser extent corresponding to said gaps to define a sealed central part and two sealed lateral flaps at each end; and
    folding the central part against the corresponding end of the batch and then folding the flaps along said weakened fold lines against the folded central part.

* * * * *